(12) United States Patent
Kobayashi

(10) Patent No.: US 6,950,559 B2
(45) Date of Patent: Sep. 27, 2005

(54) IMAGE PROCESSING APPARATUS, IMAGE PROCESSING CIRCUIT, AND IMAGE PROCESSING METHOD

(75) Inventor: Kenji Kobayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 09/795,493

(22) Filed: Mar. 1, 2001

(65) Prior Publication Data

US 2001/0028466 A1 Oct. 11, 2001

(30) Foreign Application Priority Data

Mar. 3, 2000 (JP) .................................... P.2000-058639

(51) Int. Cl.[7] .................................................. G06K 9/40
(52) U.S. Cl. ........................ 382/260; 382/318; 358/505
(58) Field of Search ................. 382/260–265, 382/312–324, 205, 308, 284, 206; 358/505–514, 426.1, 426.05, 450, 451, 473–498

(56) References Cited

U.S. PATENT DOCUMENTS

| | | | | |
|---|---|---|---|---|
| 4,193,097 A | * | 3/1980 | Kurahayashi et al. .. | 358/426.02 |
| 4,369,430 A | * | 1/1983 | Sternberg ................... | 382/205 |
| 4,550,437 A | * | 10/1985 | Kobayashi et al. ......... | 345/505 |
| 4,613,986 A | * | 9/1986 | Ataman et al. ............. | 382/260 |
| 4,868,657 A | * | 9/1989 | Samuels ..................... | 348/441 |
| 4,876,612 A | | 10/1989 | Honma et al. .............. | 358/474 |
| 5,163,100 A | * | 11/1992 | Mathieu et al. ............. | 382/304 |
| 5,251,023 A | * | 10/1993 | Arimoto et al. ............ | 358/529 |
| 5,390,262 A | * | 2/1995 | Pope ........................... | 382/234 |
| 5,997,131 A | | 12/1999 | Kohno ......................... | 347/40 |
| 6,233,067 B1 | * | 5/2001 | Itano et al. ................. | 358/491 |

FOREIGN PATENT DOCUMENTS

| | | |
|---|---|---|
| JP | 6-004661 | 1/1994 |
| JP | 8-287221 | 11/1996 |
| JP | 9-018698 | 1/1997 |

* cited by examiner

Primary Examiner—Bhavesh M. Mehta
Assistant Examiner—Dennis Rosario
(74) Attorney, Agent, or Firm—Oblon, Spivak, McClelland, Maier & Neustadt, P.C.

(57) ABSTRACT

Data, on which one page of original image data should be image-processed, indicates a first block image ($G_1$) constructed of continuous "n" lines of the original image, commenced from a top line thereof; and a second block image ($G_2$) through an M-th block image ($G_M$). Each of the second to M-th block images is comprised of continuous "n" lines of the original image, and overlapped portions for "d" lines are present between the first to (M–1)-th block images ($G_1$ to $G_{M-1}$) and the second to M-th block images ($G_2$ to $G_M$), respectively. With respect to each of the block images, (n×W) pieces of pixel data indicative of this block image are supplied to an image processing circuit in both a column positional order and a line positional order, while the column position owns a top priority.

7 Claims, 12 Drawing Sheets

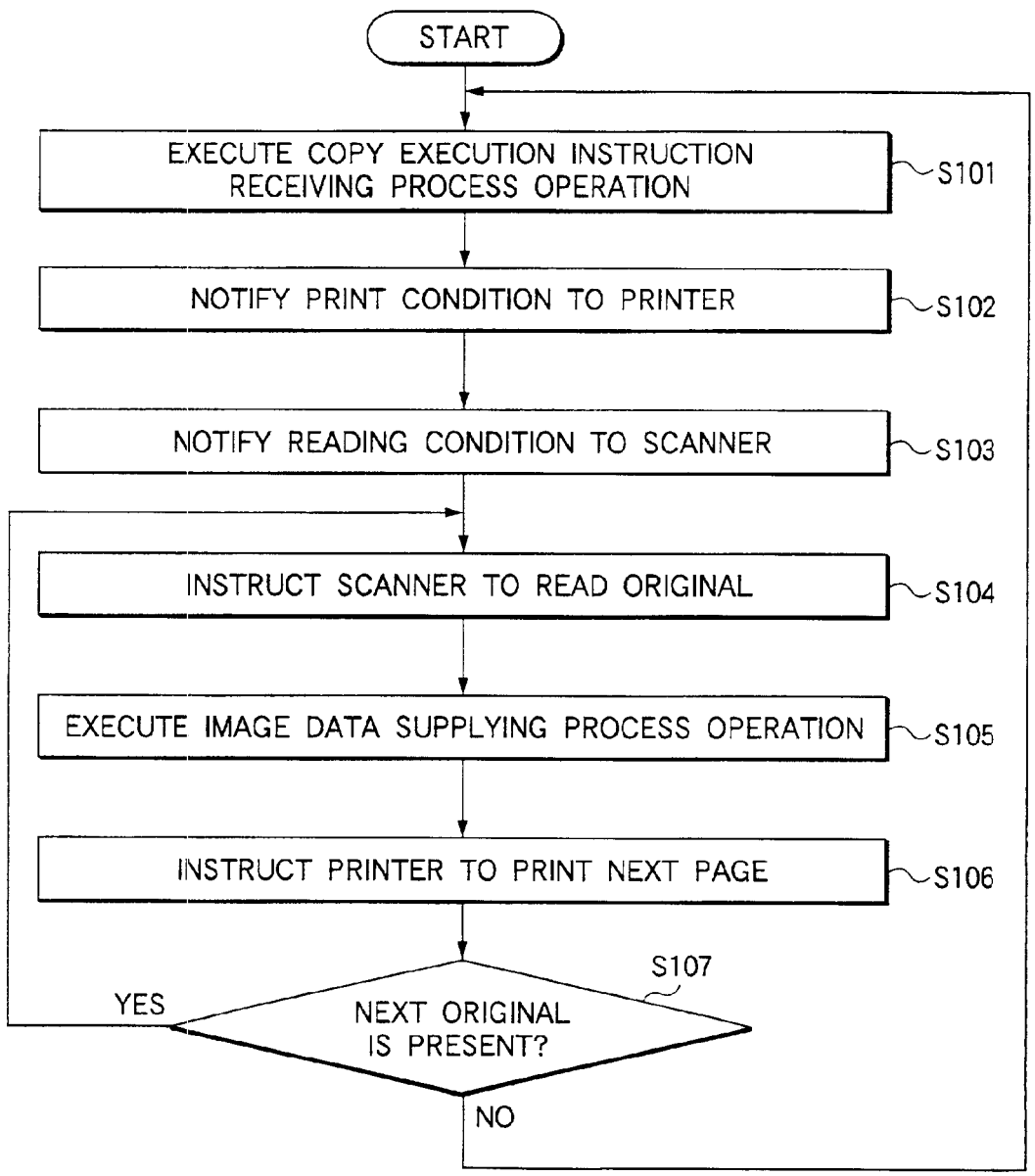

FIG.10

| | state=0 | | state=1 | | state=2 | |
|---|---|---|---|---|---|---|
| | data0 (SELECTOR) #0 | data1 (SELECTOR) #1 | data0 (SELECTOR) #0 | data1 (SELECTOR) #1 | data0 (SELECTOR) #0 | data1 (SELECTOR) #1 |
| shift0=1 | dataA_0 | dataB_0 | dataB_0 | dataC_0 | dataC_0 | dataA_0 |
| shift1=1 | dataA_1 | dataB_1 | dataB_1 | dataC_1 | dataC_1 | dataA_1 |
| shift2=1 | dataA_2 | dataB_2 | dataB_2 | dataC_2 | dataC_2 | dataA_2 |
| shift3=1 | dataA_3 | dataB_3 | dataB_3 | dataC_3 | dataC_3 | dataA_3 |
| shift4=1 | dataA_4 | dataB_4 | dataB_4 | dataC_4 | dataC_4 | dataA_4 |
| shift5=1 | dataA_5 | dataB_5 | dataB_5 | dataC_5 | dataC_5 | dataA_5 |
| shift6=1 | dataA_6 | dataB_6 | dataB_6 | dataC_6 | dataC_6 | dataA_6 |
| shift7=1 | dataA_7 | dataB_7 | dataB_7 | dataC_7 | dataC_7 | dataA_7 |
| shift8=1 | dataA_8 | dataB_8 | dataB_8 | dataC_8 | dataC_8 | dataA_8 |
| shift9=1 | dataA_9 | dataB_9 | dataB_9 | dataC_9 | dataC_9 | dataA_9 |
| shift10=1 | dataA_10 | dataB_10 | dataB_10 | dataC_10 | dataC_10 | dataA_10 |
| shift11=1 | dataA_11 | dataB_11 | dataB_11 | dataC_11 | dataC_11 | dataA_11 |
| shift12=1 | dataA_12 | dataB_12 | dataB_12 | dataC_12 | dataC_12 | dataA_12 |
| shift13=1 | dataA_13 | dataB_13 | dataB_13 | dataC_13 | dataC_13 | dataA_13 |
| shift14=1 | dataA_14 | dataB_14 | dataB_14 | dataC_14 | dataC_14 | dataA_14 |
| shift15=1 | dataA_15 | dataB_15 | dataB_15 | dataC_15 | dataC_15 | dataA_15 |

IMAGE PROCESSING APPARATUS, IMAGE PROCESSING CIRCUIT, AND IMAGE PROCESSING METHOD

BACKGROUND OF THE INVENTION

1. Field of the Invention

The present invention relates to an image processing apparatus, an image processing circuit, and an image processing method for executing an image processing operation.

The present application is based on Japanese Patent Application No. 2000-058639, which is incorporated herein by reference.

2. Description of the Related Art

As is well known in the technical field, as apparatuses for executing image processing operations, there are provided apparatuses for executing image processing operations in a software manner, and apparatuses equipped with image processing circuits (LSIs for image processing purposes) capable of executing image processing operations. As an example of the latter-mentioned apparatuses, for example, such an apparatus for executing a copying operation is known, while both a scanner and a printer are controlled in an integration manner. This type of known apparatus is equipped with an image processing circuit for converting image data output by the printer into image data which is suitably provided to be printed out.

The image processing circuit employed in such a known apparatus is arranged by coupling several sets of circuits used to execute specific image processing operations (will be referred to as "image processing modules" hereinafter). Also, each of these image processing modules is arranged by an h×h filter, and a circuit used to supply pixel data to this h×h filter. The h×h filter calculates one piece of image data based upon pixel data (pixel value) related to an h×h image (normally, symbol "h" being equal to 3, or 5), and outputs the calculated image data. The circuit contains a buffer capable of storing thereinto (h−1) lines of image data which is required to be processed.

The image processing apparatus equipped with the image processing circuit corresponds to such an apparatus that the size (namely, pixel number per one line) of the image data which can be processed is restricted by the image processing circuit. In other words, in order that this image processing apparatus may process image data having a larger size than the above-described image data size, the image processing circuit must be newly designed/manufactured.

Then, as previously explained, since the image processing circuit employs such a circuit arrangement in which the buffer capable of storing thereinto the (h−1) lines of image data is provided with respect to each of these image processing modules, an image processing circuit capable of executing a desirable image processing operation may not be manufactured by way of an one-chip LSI in such a case that a total number of pixels per one line contained in image data to be processed is large. In such a difficult case, the following cumbersome works have been necessarily carried out. That is to say, while plural sets of suitable image processing circuits are designed and manufactured, the image processing apparatus capable of mounting thereon these image processing circuits should be altered to finally obtain such a desirable image processing apparatus.

SUMMARY OF THE INVENTION

Therefore, an object of the present invention is to provide an image processing apparatus, an image processing circuit, and an image processing method, each of which is capable of processing image data having an arbitrary image size.

According to a first aspect of the present invention, there is provided an image processing apparatus for entering thereinto image data comprised of a plurality of pixel data and for image-processing the respective pixel data to output the image-processed pixel data. The apparatus comprises: an image data storage unit capable of storing "n" pieces of lines, each of which has "W" pieces of pixel data, and capable of storing thereinto an input image data in order of the lines, where the "n" is predetermined value, and the "W" is predetermined value; an image processing circuit, which has a pixel data holding amp unit including "X" pieces of pixel data column holding units capable of holding the "n" pieces of the pixel data, where the "X" is a predetermined value smaller than the predetermined value "W", and which executes an image processing operation by using a filter which has an "h" and a "g", where the "h" is a predetermined value smaller than, or equal to the predetermined value "X", and the "g" is a predetermined value smaller than, or equal to the predetermined value "n"; and an image data supplying unit which reads out the pixel data stored in the image data storage unit along a column direction, and supplies the read pixel data to the image processing circuit.

According to a second aspect of the present invention, it is preferable that in an image processing apparatus, in case where a total line number of image data to be image-processed is larger than the predetermined value "n", the image data supplying unit subdivides the image data into a plurality of image data blocks to supply the plural image data blocks to the image processing circuit, and wherein when the image data blocks are supplied to the image processing circuit after a second data block supplying operation, the image data supplying unit overlaps one image data block preceding to the relevant image data block with a (g−1) line.

According to a third aspect of the present invention, there is provided an image processing circuit for inputting thereinto pixel data and for image-processing the input pixel data to output the image-processed pixel data. The circuit comprises: a pixel data holding unit including "X" pieces of pixel data column holding units capable of holding "n" pieces of pixel data, where the "X" is a predetermined value, and the "n" is a predetermined value; a pixel data updating process unit which updates content of the pixel data column holding unit every time pixel data of the predetermined value "n" are input; and an image processing unit which performs an image processing operation in which while a rectangular filter is employed so as to process the pixel data held in the pixel data holding unit, a line direction of the filter is equal to "h" corresponding to a predetermined value smaller than, or equal to the predetermined value "X", and a column direction of the filer is equal to "g" corresponding to a predetermined value smaller than, or equal to the predetermined value "n"; a direction along which the pixel data held in the respective pixel data column holding units are arranged in one column is made in correspondence with the column direction of the filter; and a direction along which the corresponding pixel data among the plurality of pixel data column holding units are arranged in one line is made in correspondence with the line direction of the filter.

According to a fourth aspect of the present invention, there is provided an image processing method for entering image data comprised of a plurality of pixel data, and for image-processing the respective pixel data to output the image-processed pixel data. The method comprises the steps of: storing, into an image data storing unit capable of storing "n" pieces of lines each having "W" pieces of pixel data, an input image data in order of the lines, where the "W" is a predetermined value per 1 line, and the n is a predetermined value; causing a pixel data storing unit to hold at least one group of the "n" pieces of pixel data, wherein the pixel data storing unit is capable of holding "X" groups of the "n" pieces of pixel data, where the "X" is a predetermined value smaller than the predetermined value "W"; reading out the pixel data stored in the image data storing unit along a column direction; supplying the read pixel data to the pixel data storing unit; and executing an image processing operation with respect to the pixel data stored in the pixel data storing unit by using a filter which has an "h" and a "g", where the "h" is a predetermined value smaller than, or equal to the predetermined value "X", and the "g" is a predetermined value smaller than, or equal to the predetermined value "n."

According to a fifth aspect of the present invention, there is provided an image processing apparatus which comprises: an image processing circuit which receives image data containing a plurality of pixel data indicative of an image to be processed, in which a total number of pixels along a line direction is made coincident with a predetermined value "n", and outputs image data obtained by image-processing the received image data, and one set or more sets of pixel data in which "q" pieces of pixels are arranged along the line direction of the image to be processed are required for a calculation of one piece of pixel data; and an original image data supplying unit which produces block image data based upon both original image data to be image-processed and an integer value "d" obtained by subtracting "1" from the predetermined value "q" and the "n" value with respect to a block image comprised of continuous "n" lines of pixels on an original image indicated by the original image data, a column direction of the original image being regarded as the line direction in the block image data; executes a supply processing operation plural times, by which the block image data is supplied to the image processing circuit; and produces such block image data related to a block image which is comprised of continuous "n" lines of pixels containing a lower-ended "d" line of pixels within a block image directed to a preceding supply process operation when each of the supply processing operations subsequent to a second supply processing operation is executed.

In other words, the image processing apparatus according to the fifth aspect of the present invention owns the following arrangement: In this image processing apparatus, several pieces of block image data are produced based upon the original image data to be image-processed, while considering both the reduction amount "d" (=q−1) of the image size along the line direction by way of the image processing circuit and the total pixel number "n" per 1 line as to the image data which can be processed by the image processing circuit. Then, the respective block image data are processed by the image processing circuit. As a result, in accordance with the image processing apparatus of the present invention, the image processing operation can be carried out with respect to the image data indicative of the image having an arbitrary size. Also, since the image processing circuit having the above-explained function may be realized by merely employing such buffers capable of storing thereinto the plural pixel data corresponding to the preselected number "n", the image processing apparatus according to the present invention may be realized by mounting the image processing circuits, the total number of which is smaller than those of the image processing circuits employed in the related image processing apparatus.

As the image processing circuit, any types of image processing circuits may be used in the image processing apparatus according to the fifth aspect of the present invention, which require such data comprised of "q" pieces of pixel data which are arranged along the line direction of the image to be processed.

Therefore, according to a sixth aspect of the present invention, for example, while using such an image processing circuit including a first image processing module with employment of an (m×m) filter; and a second image processing module with employment of a (q−m+1)×(q−m+1) filter, the image processing apparatus may be realized.

According to a seventh aspect of the present invention, when the image processing apparatus according to the fifth aspect of the present invention is realized, such an image processing circuit capable of changing the "q" values may be employed. In this case, as the original image data supplying unit, the following unit may be employed. That is, an original image data supplying unit recognizes the "q" value before commencing the image processing operation with respect to the original image data, and calculates as the integer value "d", such a value obtained by subtracting "1" from the recognized "q" value. Concretely speaking, in the case that such an image processing circuit containing a first image processing module equipped with an $(m_1 \times m_1)$ filter, and a second image processing module equipped with an $(m_2 \times m_2)$ filter, and also capable of causing both the first and second image processing modules to function, or causing any one of these first and second image processing modules to function, when the image processing circuit causes both the first and second image processing modules to function, this original image data supplying unit recognizes the "q" value as $q=m_1+m_2-1$. When the image processing circuit causes only the first image processing module to function, the original image data supplying unit recognizes the "q" value as $q=m_1-1$. Also, when the image processing circuit causes only the second image processing module to function, the original image data supplying unit recognizes the "q" value as $q=m_2-1$. Then, the original image data supplying unit calculates as a value "d" by subtracting "1" from the recognized result.

It should be noted that when the image processing apparatus of the present invention is realized, the original image data supplying unit may handle an array of pixels of an original image along a lateral direction as a "line", and alternatively, may handle an array of pixels of an original image long a longitudinal direction as a "line." In other words, an original image may be handled as a set of block images having the same width as that of this original image and also a height of "n", and alternatively, may be handled as a set of block image having the same height as that of this original image and also a width of "n." It should be understood that when the image processing apparatus is realized as an apparatus for processing general-purpose image data (except for such a case that image processing apparatus is realized as apparatus for processing image data which has already been stored in memory), the original image data supplying unit may preferably handle the array of the pixels of the original image along the lateral direction as the "line."

Therefore, according to an eighth aspect of the present invention, for instance, in the case that the image processing apparatus according to the present invention may serve as an apparatus for processing image data produced by a scanner, an image data receiving unit for receiving the image data output by the scanner is additionally employed, and also the original image data supplying unit may handle as the original image, such an image indicated by the image data received by the image data receiving unit, and further may handle a series of pixel data contained in the image data as data representative of one line of the original image. The series of pixel data are produced by a main scanning operation by the scanner one time.

The image data output from the scanner corresponds to such data acquired by repeating the scanning operation of the original along the lateral direction from the upper portion of the original to the lower portion of this original. As a result, when this arrangement is employed, the original image data supplying unit can supply to the image processing unit, block image data related to a block image on the side of a head portion of an original image even if the image processing apparatus need not save all of the output of data related to a final line from the scanner. In other words, since this arrangement is employed, a memory capacity required to realize the original image data supplying unit can be reduced. Also, it is possible to achieve an image processing apparatus capable of completing an image processing operation.

Alternatively, according to a ninth aspect of the present invention, when the image processing apparatus according to the eighth aspect of the present invention is realized, while the image data receiving unit is additionally provided, this image processing apparatus may be further provided with a buffer memory for temporarily storing thereinto the image data output by the image processing circuit; and a printer interface unit connected to a printer in which every time image data is stored into the buffer memory, the printer interface unit supplies a plurality of pixel data contained in the image data stored in the buffer memory to the printer in a preselected sequence different from such a sequence at which the pixel data are output from the image processing circuit.

In accordance with the image processing apparatus according to the ninth aspect of the present invention, copying operations can be carried out in a high speed.

BRIEF DESCRIPTION OF THE DRAWINGS

FIG. 3 is a flow chart for describing an overall sequential operation of the image processing apparatus according to the embodiment mode;

FIG. 10 is an explanatory diagram for explaining operations of selectors #1 and #2 employed in the 3×3 register;

DETAILED DESCRIPTION OF THE PREFERRED EMBODIMENT

Referring now to drawings, various embodiment modes of the present invention will be described in detail.

An image processing apparatus, according to an embodiment mode of the present invention, corresponds to an apparatus for converting image data produced by a scanner into image data suitable for a printing operation.

Figure 1:
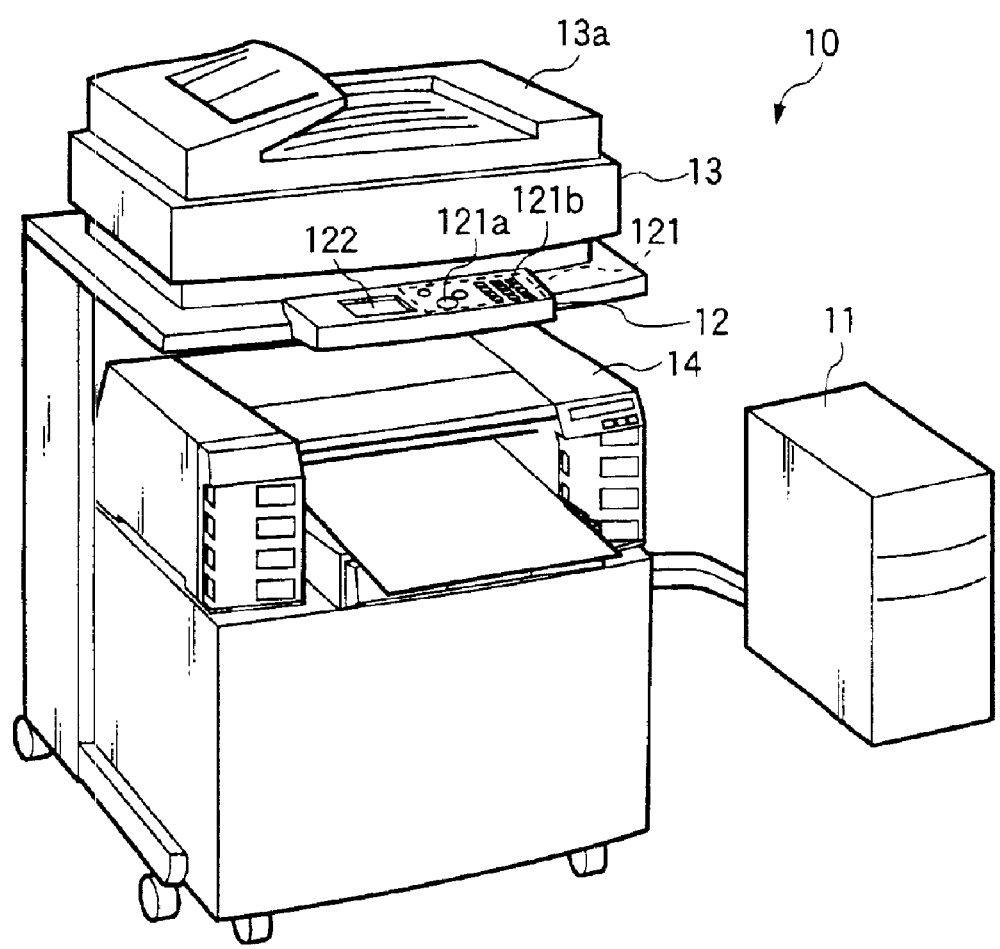
FIG. 1 is an explanatory diagram for explaining use modes of an image processing apparatus according to an embodiment mode of the present invention.

As indicated in FIG. 1, an image processing apparatus 11, according to this embodiment mode, is used, while this image processing apparatus 11 is connected to an operation apparatus 12, a scanner 13, and a printer 14. A system arranged by the image processing apparatus 11, the operation apparatus 12, the scanner 13, and the printer 14 will be referred to as a copying system 10 hereinafter.

The operation apparatus 12 corresponds to such an apparatus which is used by a user so as to issue various sorts of instructions to the copying system 10 (image processing apparatus 11). The operation apparatus 12 is provided with a key operation unit 121 constructed of a start button 121a, a ten key (numeral entry key) 121b, and the like Also, the operation apparatus 12 is equipped with a touch screen 122. The touch screen 122 is comprised of a liquid crystal panel, and a touch panel overlapped on this liquid touch panel.

The scanner 13 corresponds to an electronic appliance for optically reading an image formed on an original to output image data representative of this read image. In this copying system 10, as this scanner 13, the following electronic appliance is employed. That is, the electronic appliance having a SCSI interface is equipped with an ADF (auto-document feeder) 13a, and outputs image data containing 24-bit RGB data as pixel data of the respective pixels (pixel values). The printer 14 corresponds to an electronic appliance for forming an image on paper in response to supplied print data. In this copying system 10, as the printer 14, an ink-jet type printer is employed. This ink-jet type printer owns a parallel interface, and is capable of performing a color printing operation, while maintaining the same resolution as that of the scanner 13.

Figure 2:
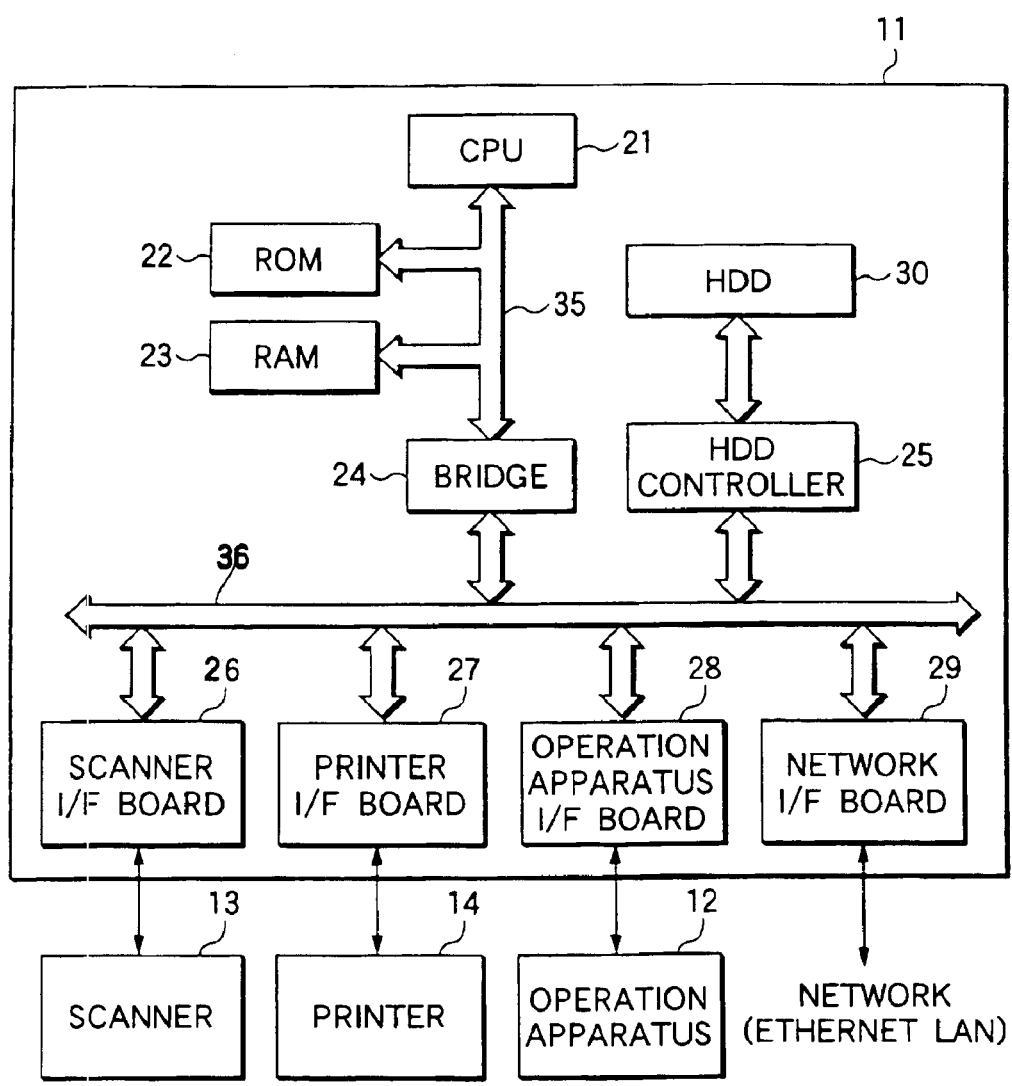
FIG. 2 shows a hardware structural diagram of the image processing apparatus according to the embodiment mode.

FIG. 2 represents a hardware structure of the image processing apparatus 11. As indicated in this drawing, the image processing apparatus 11 is provided with a CPU 21, a ROM 22, a RAM 23, and a bridge 24, which are mutually connected via a CPU bus 35. Also, this image processing apparatus 11 is equipped with an HDD controller 25, an I/F board 26 used for the scanner, an I/F board 27 used for the printer, an I/F board 28 used for the operation panel, and an I/F board 29 used for the network. Also, the image processing apparatus 11 is provided with an HDD (hard disk drive) 30 connected to the HDD controller 25.

The HDD 30 corresponds to an auxiliary storage apparatus into which an operating system (OS), various programs operated on this operating system, and various sorts of drivers are stored. These various sorts of drivers are a scanner driver used to control the scanner 13, and a printer driver used to control the printer 14. The HDD controller 25 corresponds to a control circuit of the HDD 30. This control circuit is such an interface circuit for interfacing the HDD 30 and a general-purpose bus 36.

The bridge 24 corresponds to an interface circuit for interfacing the CPU bus 35 with the general-purpose bus 36. The CPU 21 corresponds to a circuit for controlling the various units provided in the image processing apparatus 11 in an integral manner. The ROM 22 corresponds to a memory for storing thereinto various sorts of BIOSs. The RAM 23 is such a memory where the various programs stored in the ROM 22 and the HDD 30 are read out. This RAM 23 may also be used to temporarily store thereinto the image data output by the scanner 13.

The network I/F board 29 corresponds to an interface board used to connect the image processing apparatus 11 to an Ethernet LAN. The operation apparatus I/F board 28 corresponds to such an interface board by which the CPU 21 can use the operation apparatus 12. The operation I/F board 28 contains input/output control circuits for controlling various electronic appliances (key operation unit 121, and touch screen 122) employed in the operation apparatus 12.

The scanner I/F board 26 corresponds to such an interface board by which the CPU 21 can use, or can control the scanner 13. In the image processing apparatus 11 according to this embodiment mode, a so-called "SCSI" interface board" is employed as this scanner I/F board 26. The printer I/F board 27 corresponds to such an interface board by which the CPU 21 can use the printer 14. The function of this printer I/F board 27 will be explained more in detail.

Operations of the image processing apparatus 11 will now be described.

FIG. 3 shows an overall operation sequence of the CPU 21 employed in the image processing apparatus 11. As shown in this flow operation chart, the CPU 21 provided in the image processing apparatus 11 executes a copy execution instruction receiving process operation (defined at step S101) under normal condition (namely, under such condition that CPU does not execute other process operations). This copy execution instruction receiving process operation corresponds to such a process operation that a copy execution instruction issued from a user is received.

When this copy execution instruction receiving process operation is carried out, the CPU 21 updates a content of a screen displayed on the liquid crystal panel in response to an operation content with respect to either the key operation unit 121 or the touch panel in order to recognize a copy condition (namely, control condition of scanner 13 and control condition of printer 14). Then, when the CPU 21 detects such a fact that the start button 121a is depressed, this copy execution instruction receiving process operation defined at the step S101 is accomplished.

After the process operation of the above step S101 is accomplished (namely, when CPU 21 detects depression of start button 121a), the CPU 21 notifies a print condition defined in accordance with the copy condition to the printer 14 (step S102), and also notifies a read condition defined in accordance with the copy condition to the scanner 13 (step S103). Subsequently, the CPU 21 instructs the scanner 13 to read an original (namely, to output image data) at a step S104.

Thereafter, the CPU 21 executes an image data supplying process operation corresponding to such a process operation that image data transferred from the scanner 13 is supplied via the RAM 23 to the printer I/F board 27 (step S105). While the content of the image data supplying process operation will be explained in detail, since this image data supplying process operation is executed, one page of print data is supplied to the printer 14. This print data corresponds to such image data produced by image-processing the image data derived from the scanner 13.

After the image data supplying process operation is completed, the CPU 21 instructs the printer 14 to execute a printing operation of the next page (step S106). Thereafter, the CPU 21 judges as to whether or not an original to be copied is left in the ADF 13a of the scanner 13 (step S107). When the original to be copied is left ("YES" at step S107), the process operation is returned to the previous step S104 at which the CPU 21 instructs the scanner 13 to read the next original. On the other hand, when the original to be copied is not left in the ADF 13a ("NO" at step S107), the process operation is returned to the first step S101 at which the CPU 21 waits for issuing of the next copy execution instruction. Although not shown in the above-explained flow chart, in such a case that the scanner 13 is not equipped with the ADF 13a, the CPU 21 executes the copy execution instruction receiving process operation defined at the step S101 after the process operation of the step S106 is ended.

Next, a description will now be made of operations of the image processing apparatus 11 when the image data supplying process operation is carried out. It should be noted that image data transferred from the scanner 13 is referred to be "original image data", and an image (pixel matrix) indicative of original image data is referred to be an "original image" in the below-mentioned description.

Figure 4A:
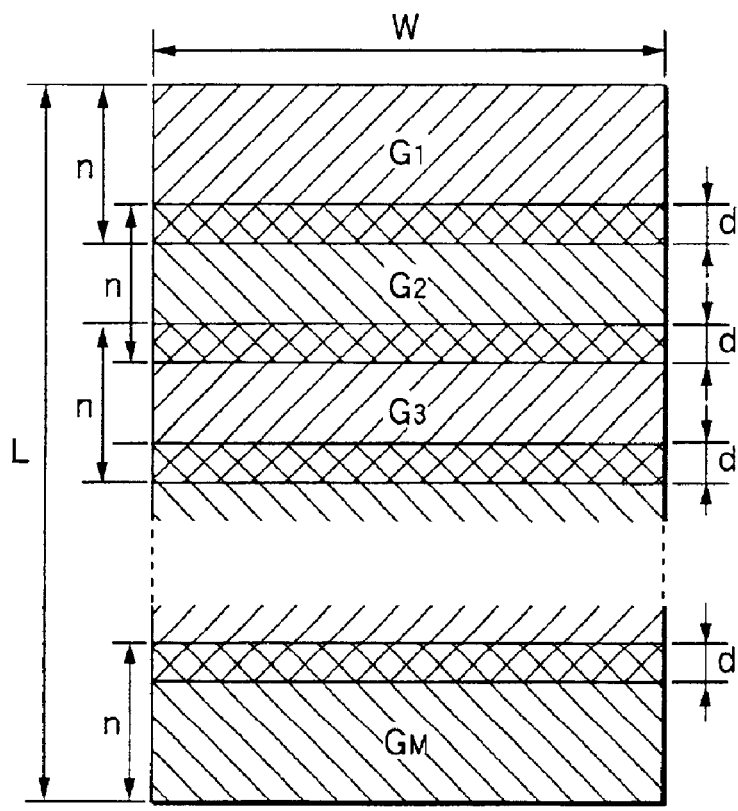
FIGS. 4(A) and 4(B) show an illustration for describing an image data supplying process operation executed in the image processing apparatus according to the embodiment mode.

As schematically indicated in FIG. 4(A), in this image processing apparatus 11, one page of original image data including "L" lines of data is handled as such image data indicative of: a first block image "$G_1$"; a second block image "$G_2$" through an (M−1)th block image "$G_{M-1}$", and an Mth block image "$G_M$." The first block image "$G_1$" is comprised of continuous "n" lines which are started from a top (head) line of the original image. The second block image "$G_2$" through the (M−1)th block image "$G_{M-1}$" are comprised of continuous "n" lines contained in the original image, and overlapped portions made of "d" lines are present among the first block image $G_2$ through an (m−2)th block image "$G_{M-2}$." The Mth block image "$G_{M+1}$" is comprised of continuous "n" lines contained in the original image, and contains a last line of the original image, and also an overlapped portion made of "d" lines is present between the (M−1)th block image $G_{M-1}$ and the own block image $G_M$. In this embodiment mode, a "line" implies a group of pixels which are expressed by one line of image data transmitted by the scanner 13, whereas a "top line" implies a group of pixels which are represented by one line of image data transmitted by the seamier 13 at a first time, which is instructed to read an original. Also, symbols "n" and "d" are equal to integer values (n−16, and d=4 in this embodiment mode, will be discussed in detail). These integer values are determined by circuit structures of the image processing circuit 40, respectively.

Figure 4B:
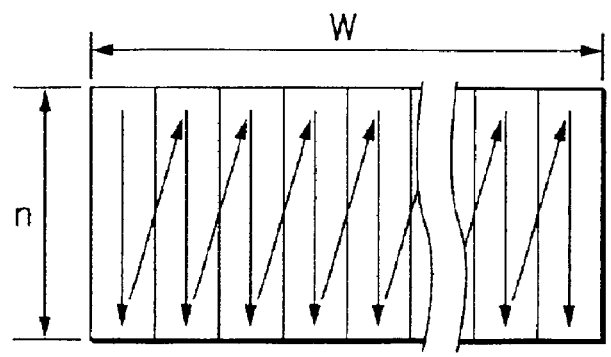

Then, as schematically indicated in FIG. 4(B), when the image data supplying process operation is carried out, such a process operation is carried out with respect to each of the first block image G1 through the Mth block image GM as follows: (n×W) pieces of pixel data for indicating the relevant block image are supplied one by one to the printer I/F board 27 in a column positional order and a line positional order, while column positions of pixels indicated by each of the pixel data own a top priority. In this case, symbol "W" indicates a total number of pixels which form one line of an original image. In other words, such a process operation that "n" pieces of pixel data related to each of columns of a block image are supplied one by one to the printer I/F board 27 in the line positional order is repeatedly carried out from the top column side to each of the lines. This process operation will now be referred to as a "block image data supplying process operation".

Concretely speaking, when the image data supplying process operation is carried out, the respective pixel data transferred from the scanner 13 are stored into the RAM 23 in such a storage format that both the line positions and the column positions of the pixels indicated by the pixel data are defined in correspondence with each other. Then, when such pixel data indicative of the first block image is prepared on the RAM 23, a block image data supplying process operation related to the first block image is carried out. When such pixel data representative of the second through the Mth block images are prepared on the RAM 23, block image data supplying process operations related to the second block image through the Mth block image are executed. Also, when the image data supplying process operation is carried out, another process operation capable of deleting such pixel data which is no longer required on the RAM 23 may be performed.

Figure 5:
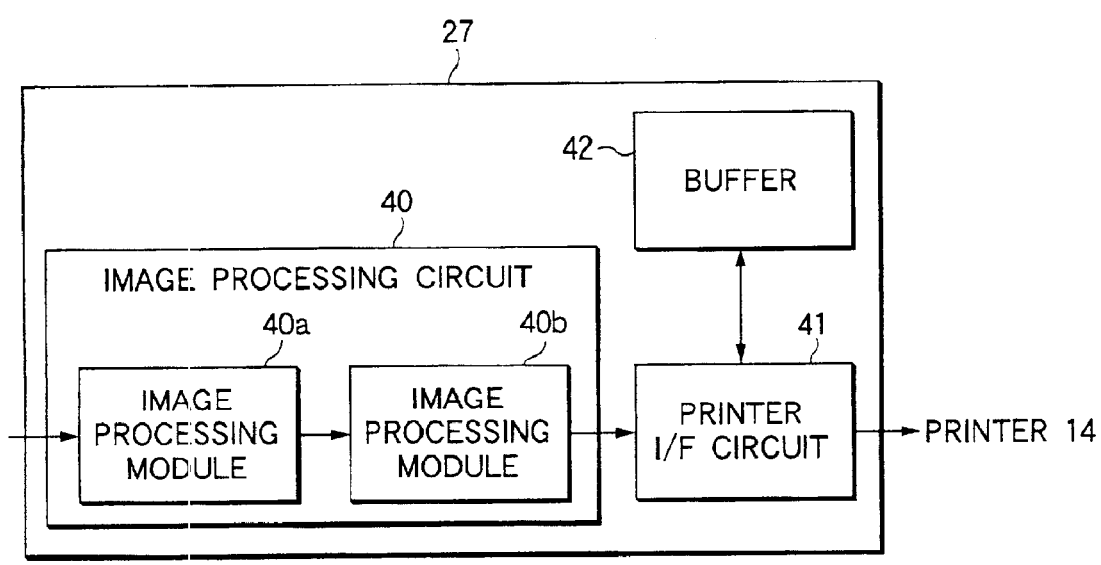
FIG. 5 represents a structural diagram of a printer I/F board provided with the image processing apparatus according to the embodiment mode.

As indicated in FIG. 5, the printer I/F board 27 to which the pixel data is supplied by executing the block image data supplying process operation is provided with an image processing circuit 40, a printer I/F circuit 41, and a buffer memory 42 as a major structural element.

The image processing circuit 40 corresponds to such an ASIC which is designed/manufactured in such a manner that image data can be processed in which a total pixel number per 1 line (namely, total pixel number for forming 1 line) is equal to 16. The image processing circuit 40 contains a circuit arrangement comprised of coupling an image processing module 40a for executing an image processing operation of removing a moire pattern, and an image processing module 40b for executing an image processing operation of emphasizing an edge.

Each image processing module 40x (x=a, or b) is made of a circuit (namely, circuit employing 3×3 filter) which requires 9 pieces (in total) of pixel data in order to calculate/output pixel data related to a certain pixel. These 9 pixel data are related to this relevant pixel and 8 pixels located in the vicinity of (around) this relevant pixel. In other words, the pixel data which may be obtained by each image processing module 40x are only such pixel data related to the respective pixels of such an image which should be image-processed except for pixels located at an upper end position, a lower end position, a left end position, and a right end position of this image (namely, 8 pixels located around relevant pixel). As a result, since the image processing operation by each image processing module 40x is performed, image data indicative of an image having a certain size may be converted into such image data indicative of an image, the sizes (pixel numbers) of which along the longitudinal direction and the lateral direction are reduced by "2" (namely 2=3−1), respectively.

Then, since the image processing circuit 40 corresponds to such a circuit made by coupling the image processing module 40a to the image processing module 40b (namely, circuit for requiring 5×5 pieces of pixel data so as to calculate/output one piece of pixel data), when the image processing operation is carried out by the image processing circuit 40, the sizes of the image would be reduced by "4", respectively, along the longitudinal direction and the lateral direction. It should be understood that this reduced amount "4" may be obtained by way of "reduced amount=2+2" in such a case that this reduced amount is considered based upon the reduced amount in the unit of image module, whereas this reduced amount "4" may be obtained by way of "reduced amount=5−1" in such a case that this reduced amount is considered based upon a total number of pixel data arranged along the line direction of the image processing circuit 40, which are required to calculate one piece of pixel data. This total number of the pixel data is made coincident with "reduced amount+1."

The reason why the above-described image data supplying process operation according to this embodiment mode is performed under d=4 and n=16 is given as follows: That is, the reduced amount of the image size by the image processing circuit 40 is equal to "4", and the pixel number per 1 line of the image data which is to be image-processed by the image processing circuit 40 is equal to "16" (meaning of image data supplying process operation itself will be discussed later).

In the case that the reduced amount of the image size along the line direction by the image processing circuit 40 is different from the reduced amount of the image size along a direction perpendicular to the line direction, the reduced amount along the direction is employed as "d." For example, the following case will now be considered: That is, while the image processing circuit 40 arranged by coupling a first image processing module through a Pth image processing module to each other is employed in the image processing apparatus 11, an ($h_i \times g_i$) filter (pixel data number along line direction is equal to $h_i$; $h_i \geq 3$) is mounted on "i"-th image processing modules (symbol "i" is equal to 1 to P) of this image processing circuit 40. In this case, the reduced amount of the image processing circuit 40 along the line direction is equal to a total value of the reduced amounts of the pixel numbers of the respective image processing modules along the line direction, and since the i-th image processing modules reduce the pixel number along the line direction by ($h_i$−1) numbers, the reduced amount "d" may be calculated from such a formula "d=($h_1$−1)+($h_2$−1)+, - - - ,+($h_p \times 1$). Note that only (X−($h_1$−1)×(Y−($g_1$−1)) pieces of ($h_i \times g_i$) windows are not arranged on the X×Y image.

Figure 6:
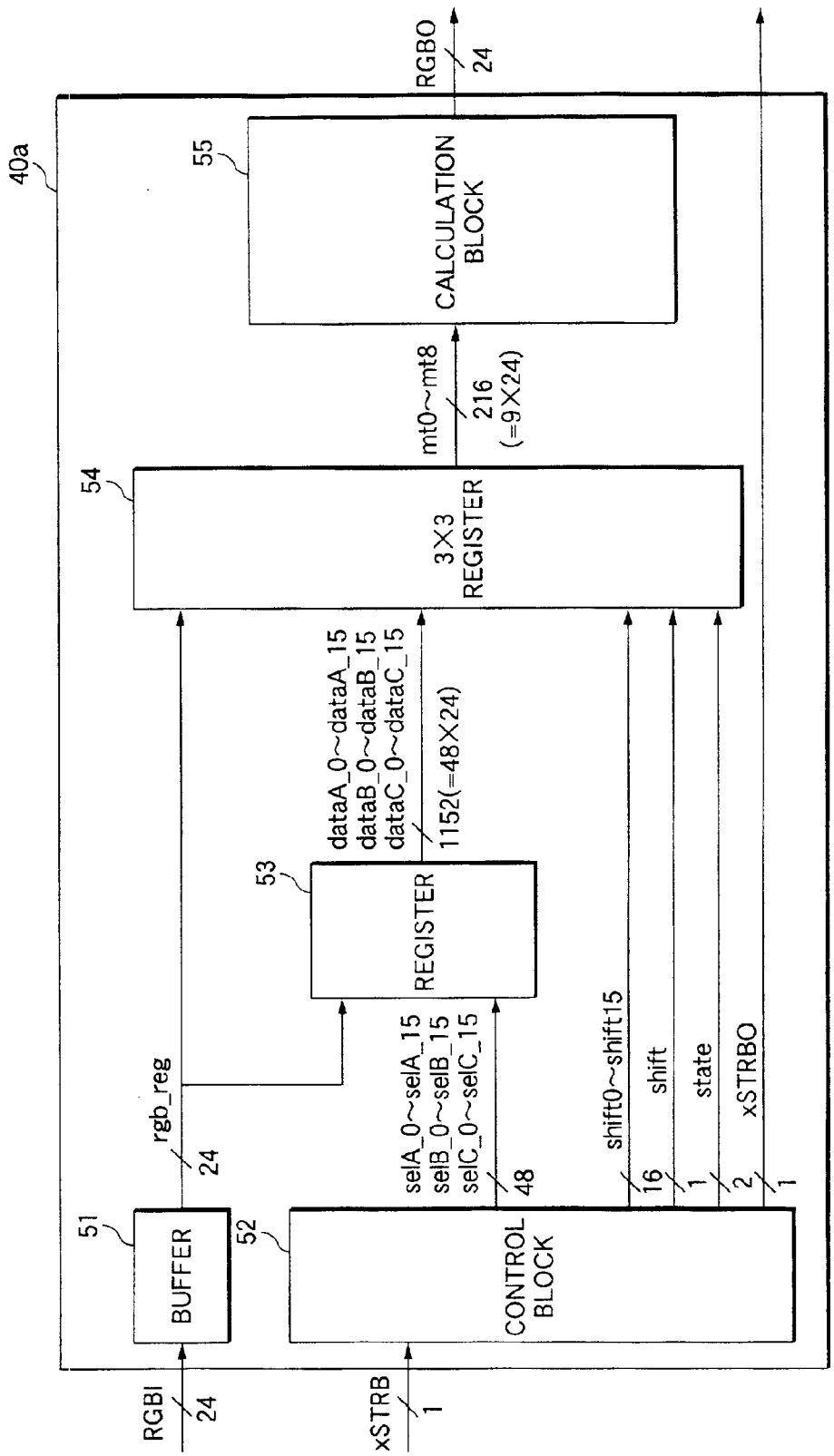
FIG. 6 is a structural diagram for indicating an image processing circuit employed in the printer I/F board.
Figure 7:
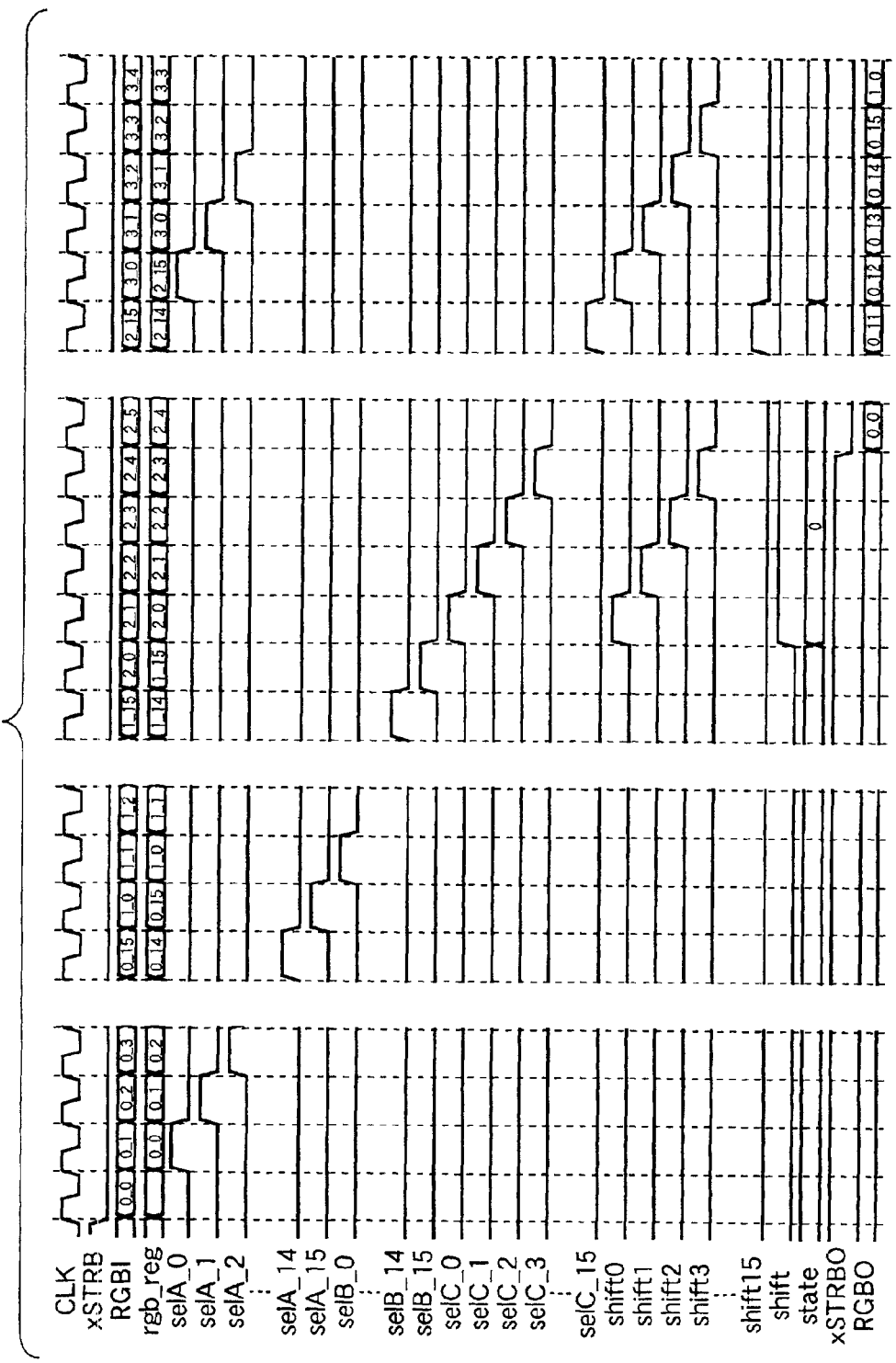
FIG. 7 is a timing chart for explaining operations of an image processing module employed in the image processing circuit.
Figure 8:
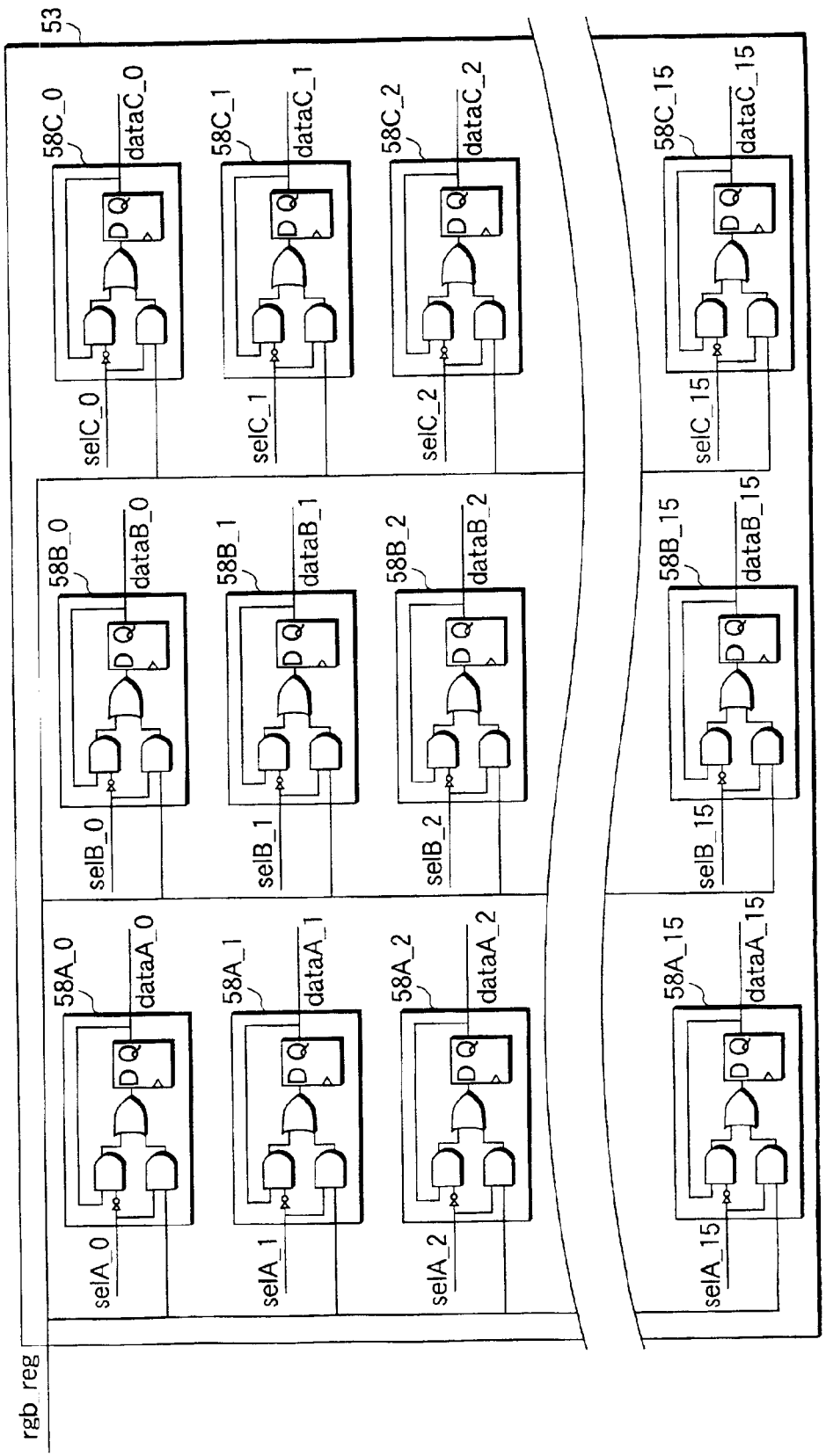
FIG. 8 is a circuit diagram of a register array contained in the image processing module.
Figure 9:
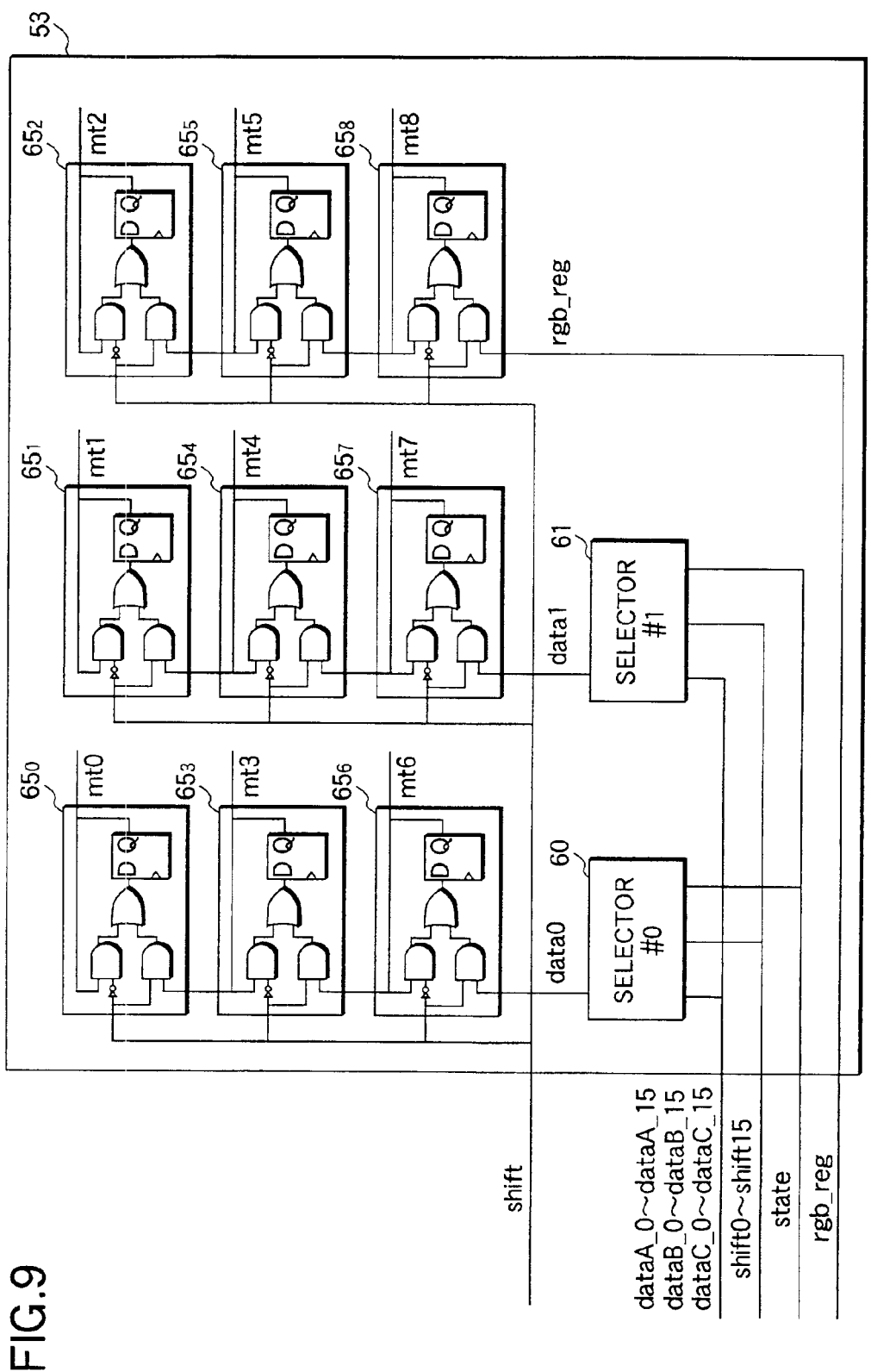
FIG. 9 shows a circuit diagram of a 3×3 register employed in the image processing module.

Referring now to FIG. 6 to FIG. 10, a description is made of an arrangement and operations of the image processing module 40a. FIG. 6 is a structural diagram of the image processing module 40a, and FIG. 7 shows a time chart for explaining the operations of the image processing module 40a. FIG. 8 and FIG. 9 are circuit diagrams of a register array and a 3×3 register, which are contained in the image processing module 40a, respectively. FIG. 10 is an explanatory diagram for explaining operations of selectors #1 and #2 contained in the 3×3 register.

As indicated in FIG. 6, the image processing module 40a is arranged by a buffer 51, a control block 52, a register array 53, a 3×3 register 54, and a calculation block 55. Pixel data RGBI having a 24-bit width is input to the buffer 51. A strobe signal xSTRB is entered into the control block 52. Also, a clock signal CLK (not shown) is input to the respective circuit portions employed in this image processing module 40a.

The pixel data RGBI corresponds to such data which is supplied to the printer I/F board 27 as a result obtained by executing the block image data supplying process operation. As indicated in FIG. 7, the content of the pixel data RGBI is changed in synchronism with the clock signal CLK. As shown in FIG. 7, the pixel data RGBI is converted into another pixel data "rgb_reg" which is changed in a temporal manner by the timing controlling buffer 51. Then, this pixel data rgb_reg is entered into both the register array 53 and the 3×3 register 54. In FIG. 7, it should be noted that symbol "i_j" such as 0_0 and 0_1 described in the time chart related to the pixel data RGBI and rgb_reg represents as follows: Both the pixel data RGBI and rgb_reg of such a time range where the relevant symbol is described are equal to pixel data (will be referred to as "pixel data i_j" hereinafter) related to a pixel defined by a j-th line and an i-th column (top line is zeroth line and top column is zeroth column) in a block image.

The strobe signal xSTRB corresponds to such a signal which owns a level of "0" while the block image data supplying process operation is carried out (namely, within time period during which pixel data RGBI indicates 1 block image of pixel data). Then, since the control block 52 into which this strobe signal xSTRB is input is operated in synchronism with the clock signal CLK while a time instant when the level of the strobe signal xSTRB is changed into "0" is set as a reference, this control block 52 outputs select signals "selA_0" to "selA_15", "selB_0" to "selB_15", "selC_0" to "selC_15"; 16 sorts of discrete shift signals "shift0" to "shift15"; a shift signal "shift"; a 2-bit state signal "state"; and a strobe signal "xSTRBO."

In other words, when the pixel data rgb_reg is equal to pixel data "3k_j" (symbol "k" is integer value larger than, or equal to "0" where 3k≦W can be satisfied), the control block 52 outputs such a signal of "1" as a select signal "selA_j" (symbol "j" is any integer value of 0 to 15). Also, when the pixel data rgb reg is equal to pixel data "3k+1_j" (symbol "k" is integer value larger than, or equal to "0" where 3k+1≦W can be satisfied), the control block 52 outputs such a signal of "1" as a select signal "selB_j." Also, when the pixel data rgb_reg is equal to pixel data "3k+2_j" (symbol "k" is integer value larger than, or equal to "0" where 3k+2≦W can be satisfied), the control block 52 outputs such a signal of "1" as a select signal "selC_j."

Also, the control block 52 outputs such a signal as the shift signal "shift" that when the select signal selC_0 firstly becomes "1", this shift signal is changed into "1", whereas when the strobe signal xSTRB is changed into "1", this shift signal becomes "0" (namely, this shift signal becomes "1" during "16×(W-2)" CLK time period). Also, the control block 52 outputs such a signal as the discrete shift signal "shiftj" that when the pixel data rgb_reg is equal to pixel data i_j, this discrete shift signal becomes "1."

Also, the control block 52 outputs as the state signal "state", such a signal indicative of "0" for a time period during which the pixel data rgb_reg indicates pixel data 3k+2_0 to 3k+2_15. Also, the control block 52 outputs as the state signal "state", such a signal indicative of "1" for a time period during which the pixel data rgb_reg indicates pixel data 3k+3_0 to 3k+3_15. Further, the control block 52 outputs as the state signal "state", such a signal indicative of "2" for a time period during which the pixel data rgb_reg indicates pixel data 3k+4_0 to 3k+4_15.

Then, the control block 52 outputs as the strobe output signal xSTRBO, such a signal which becomes "0" when a 36 CLK time period has passed after such a time instant when the strobe signal xSTRB is changed into "0," and such a signal which becomes "1" when a 4 CLK time period has elapsed after such a time instant when the strobe signal xSTRB is changed into "1" (namely, this signal maintains "1" for "16×(W-2)" CLK time period).

As indicated in FIG. 6, both the select signals selA_0 to selA_15, selB_0 to selB_15, selC_0 to selC_15, corresponding to the outputs of the control block 52, and the pixel data rgb_reg corresponding to the output of the buffer 51 are input to the register array 53.

As shown in FIG. 8, the register array 53 is arranged by registers 58A_0 to 58A_15 which output pixel data "dataA_0" to "data A_15", respectively; registers 58B_0 to 58B_15 which output pixel data "dataB_0" to dataB_15", respectively; and also registers 58C_0 to 58C_15 which output pixel data "dataC_0" to "dataC_15", respectively. The pixel data rgb_reg, the select signal selX_j, and the clock signal CLK (not shown) are input to a register "58X_j" (symbol "X" indicates any one of A, B, C, and symbol "j" represents any one of "0" to "15"). Under such a condition that the select signal selX_j having the level of "1" is input to the register 58X_j, this register 58X_j acquires the entered pixel data in synchronism with the clock signal CLK, and outputs the acquired pixel data in synchronism with the clock signal CLK (namely, for next CLK time period). Under such a condition that the select signal selX_j having the level of "0" is input to the register 58X_j, this register 58X_j continuously outputs the acquired pixel data in the case that the select signal selX_j having the level of "1" is entered thereinto.

In other words, the register array 53 is operated in the below-mentioned manner.

As previously explained in the above description, when the pixel data rgb_reg indicates the pixel data 3k_j, the select signal selA_j becomes "1." Also, when the pixel data rgb_reg represents the pixel data 3k+1_j, the select signal selB_j becomes "1." Also, when the pixel data rgb_reg represents the pixel data 3k+2_j, the select signal selC_j becomes "1." When a certain select signal becomes "1", 47 sets of other select signals become "0."

As a result, the register 58A-j into which the select signal selA_j is input commences to output the pixel data 3k_j in the next CLK time period when the pixel data rgb_reg is changed into the pixel data 3k_j, and thereafter continuously outputs the pixel data 3k_j until the pixel data rgb_reg indicates the pixel data 3k+1_j. Also, the register 58B-j commences to output the pixel data 3k+1_j in the next CLK time period when the pixel data rgb_reg is changed into the pixel data 3k+1_j, and thereafter continuously outputs the pixel data 3k+1_j until the pixel data rgb_reg indicates the pixel data 3k+4_j. Also, the register 58C_j commences to output the pixel data 3k+2_j in the next CLK time period when the pixel data rgb_reg indicates the pixel data 3k+2_j, and thereafter continuously outputs the pixel data 3k+2_j until the pixel data rgb_reg indicates the pixel data 3k+5_j.

As a result of the above-explained operations executed by the respective registers 58, in the case that the pixel data rgb_reg represents such pixel data "3k+2_j" (symbol "k" shows an integer value larger than, or equal to "0" which can satisfy "3k+2≦W"), the pixel data 3k_0 to the pixel data 3k_15 are output as pixel data "dataA_0" to "dataA_15" from the register array 53, respectively; and also the pixel data 3k+1_0 to the pixel data 3k+1_15 are output as pixel data "dataB_0" to "dataB_15", respectively. Also, the pixel data 3k+2_0 to the pixel data 3k+2_j-1, and the pixel data 3k-1_j to the pixel data 3k-1_15 are output as pixel data "dataC_0" to "dataC_15", respectively. It should be noted that the data output as the data C_j to the dataC_15 when k=0 corresponds to no-meaning data.

Also, when the pixel data rgb_reg shows the pixel data 3k+3_j, the pixel data 3k+3_0 to the pixel data 3k+3_j-1, and also the pixel data 3k_j to the pixel data 3k_15 are output from the register array 53 as the pixel data dataA_0 to dataA_15, respectively. Also, when the pixel data rgb_reg shows the pixel data 3k+3_j, the pixel data 3k+1_0 to the pixel data 3k+1_15 are output from the register array 53 as pixel data the dataB_j to dataB_15, respectively. Also, when the pixel data rgb_reg shows the pixel data 3k+3_j, the pixel data 3k+2_0 to the pixel data 3k+2_15 are output from the register array 53 as the pixel data dataC_0 to dataC_15, respectively.

Then, when the pixel data rgb_reg shows the pixel data 3k+4_j, the pixel data 3k+3_0 to the pixel data 3k+3_15 are output from the register array 53 as the pixel data dataA_0 to dataA_15, respectively. Also, when the pixel data rgb_reg shows the pixel data 3k+4_j, the pixel data 3k+4_0 to the pixel data 3k+4_j−1 are output from the register array 53 as the pixel data dataB_j to dataB_15, respectively. Also, when the pixel data rgb_reg shows the pixel data 3k+4_j, the pixel data 3k+2_0 to the pixel data 3k+2_15 are output from the register array 53 as the pixel data dataC_0 to dataC_15, respectively.

As indicated in FIG. 6, the dataA_0 to the dataA_15; the dataB_0 to the dataB_15; and the dataC_0 to the dataC_15, which are output from the register array 53, are entered into the 3×3 register 54. Also, the shift signal "shift", the discrete shift signals shift0 to shift15, the state signal "state", and the pixel data "rgb_reg" are similarly entered into this 3×3 register 54.

As indicated in FIG. 9, the 3×3 register 53 contains a selector 60 (selector #0), another selector 61 (selector #1), and registers $65_0$ to $65_8$ which output pixel data mt0 to mt8, respectively. The discrete shift signals "shift0" to "shift 15", the state signal "state", and also the pixel data "dataA_0" to "dataA_15", "dataB_0" to "dataB_15", "dataC_0" to "dataC_15" are input to both the selector 60 and the selector 61, whereas the pixel data rgb_reg is input into the register $65_8$. Also, the data0 corresponding to the output of the selector 60 is entered into the register $65_6$, whereas the data1 corresponding to the output of the selector 61 is input to the register $65_7$.

The selector 60 is such a circuit for w outputting as the pixel data "data0", one sort of pixel data which is specified by conditions of the discrete shift signals "shift0" to "shift1" and the state signal "state", is selected from 48 sorts of entered pixel data. The selector 61 is such a circuit for outputting as the pixel data "data1", one sort of pixel data which is specified by conditions of the discrete shift signals "shift0" to "shift1" and the state signal "state", is selected from 48 sorts of entered pixel data.

Concretely speaking, as indicated in FIG. 10, in such a case that the state signal "state" is equal to "0" and the discrete shift signal "shiftj" (symbol "j"=0 to 15) is equal to "1", the selector 60 outputs the pixel data "dataA_j", and the selector 61 outputs the pixel data "dataB_j." Also, in such a case that the state signal "state" is equal to "1" and the discrete shift signal "shiftj" is equal to "1", the selector 60 outputs the pixel data "dataB_j", and the selector 61 outputs the pixel data "dataC_j." Also, in such a case that the state signal "state" is equal to "2" and the discrete shift signal "shiftj" is equal to "1", the selector 60 outputs the pixel data "dataC_j", and the selector 61 outputs the pixel data "dataA_j."

That is to say, in such a case that the discrete shift signal "shiftj" is equal to "1" and also the state signal "state" is equal to "0", while the pixel data rgb_reg indicates the pixel data 3k+2_j, the pixel data 3k_0 to 3k_15 are output as the pixel data dataA_0 to dataA_15, and also the pixel data 3k+1_0 to 3k+1_15 are output as the pixel data dataB_0 to dataB_15 from the register array 53. Then, since the pixel data dataA_j is output from the selector 60 and the pixel data dataB_j is output from the selector 61, in this case, the pixel data 3k_j, the pixel data 3k+1_j, and the pixel data 3k+2−j are eventually input into the registers $65_8$, $65_7$, and $65_6$, respectively.

Also, in such a case that the discrete shift signal "shiftj" is equal to "1" and also the state signal "state" is equal to "1", while the pixel data rgb_reg indicates the pixel data 3k+3_j, the pixel data 3k+1_0 to 3k+1_15 are output as the pixel data dataB_0 to dataB_15, and also the pixel data 3k+2_0 to 3k+2_15 are output as the pixel data dataC_0 to dataC_15 from the register array 53. Then, since the pixel data dataB_j is output from the selector 60 and the pixel data dataC_j is output from the selector 61, in this case, the pixel data 3k+1_j, the pixel data 3k+2−j, and the pixel data 3k+3_j are eventually input into the registers $65_8$, $65_7$, and $65_6$, respectively.

Further, in such a case that the discrete shift signal "shiftj" is equal to "1" and also the state signal "state" is equal to "2", while the pixel data rgb_reg indicates the pixel data 3k+4_j, the pixel data 3k+3_0 to 3k+3_15 are output as the pixel data dataA_0 to dataA_15, and also the pixel data 3k+2_0 to 3k+2_15 are output as the pixel data dataC_0 to dataC_15 from the register array 53. Then, since the pixel data dataC_j is output from the selector 60 and the pixel data dataA_j is output from the selector 61, in this case, the pixel data 3k+2_j, the pixel data 3k+3_j, and the pixel data 3k+4_j are eventually input into the registers $65_8$, $65_7$, and $65_6$, respectively.

Then, as indicated in the drawing, such a circuit constructed of the register $65_6$, the register $65_3$, and the register $65_0$ may serve as a circuit functioning as a shift register when a shift signal "shift" having a level of "1" is input thereinto. Also, such a circuit constructed of the register $65_7$, the register $65_4$, and the register $65_1$ may serve as a circuit functioning as a shift register when a shift signal "shift" having a level of "1" is input thereinto. Also, such a circuit constructed of the register $65_8$, the register $65_5$, and the register $65_2$ may serve as a circuit functioning as a shift register when a shift signal "shift" having a level of "1" is input thereinto.

As a consequence, in such a case that the pixel data "i_j+2", the pixel data "i+1_j+2", and the pixel data "i+2_j+2" and the pixel data "i+2_j+2" (symbol "j" denotes an integer value of 0 to 13) are output as pixel data "mt6", "mt7", and "mt8", the pixel data i_j+1, the pixel data i+1_j+1, and the pixel data i+2_j+1 are output as pixel data mt3, mt4, and mt5, respectively, whereas the pixel data i_j, the pixel data i+1_j, and the pixel data i+2−j are output as pixel data mt0, mt1, and mt2, respectively. In other words, when the pixel data related to the second line to the 15th line are output as pixel data mt6, mt7, mt8, 9 pieces of pixel data related to both a certain pixel and 8 pixels located around this certain pixel are output as pixel data mt0 to mt8 from the 3×3 register 54.

As indicated in FIG. 6, the pixel data int0 to mt8 are input into the calculation block 55 corresponding to the 3×3 filter. The calculation block 55 fetches 9 pieces of these pixel data in synchronism with the clock signal CLK, and then outputs one piece of pixel data as pixel data "RGB0" in correspondence with 9 Pieces of the fetched pixel data. The above-explained xSTRBO (see FIG. 7) may be such a signal that the level of this signal is changed into "0" in an 1CLK time period preceding to such a CLK time period during which this calculation block 55 outputs such pixel data corresponding to 9 pieces of pixel data related to both one pixel located in a first line and a first column, and also eight pixels located around this one pixel, and thereafter, the level of this signal is maintained at "0" during 16×(W−2) CLK time periods. It should be understood in the time chart related to the pixel data RGBO shown in FIG. 7 that such pixel data is represented as "i-j", while this pixel data is obtained from 9 pieces of pixel data related to both a pixel located in an (i−1)-th column and a j-th line, and also 8 pixels located around this pixel.

The pixel data RGBO and the strobe data xSTRBO corresponding to the outputs of the image processing module 40a are input as "RGBI" and "xSTRB" into the image processing module 40b, the structure of which is substantially identical to that of this image processing module 40a.

In this connection, the structure of the image processing module 40b will now be briefly explained. This image processing module 40b is equipped with a buffer 51, a register array 53, and a 3×3 register 54, the structures of which are the same as those employed in the image processing module 40a. Then, this image processing module 40b is further equipped with a calculation block corresponding to an edge-emphasizing 3×3 filter instead of the moire-pattern eliminating calculation block 55. Also, the image processing module 40b is equipped with a control block having a time change pattern of strobe data xSTRBO, which is different from that of the above-explained control block 52. Concretely speaking, the image processing module 40b is provided with such a control block which outputs the data xSTRBO. The level of this strobe data XSTRBO becomes "0" in a time period during which pixel data "i_2" to pixel data "i_13" (symbol "i" is equal to integer value of 0 to W−4) are output from the calculation block employed in the image processing module 40b.

In other words, since the meaningful pixel data are only the pixel data i_2 to the pixel data i_13 among the pixel data i_0 to the pixel data i_15, which are output from the calculation block of the image processing module 40b, the control block employed in the image processing module 40b is arranged in such a manner that the level of the data xSTRBO is set to "0" only in a time period during which these pixel data are output. Although the meaningful pixel data output from the calculation block 55 of the image processing module 40a are only the pixel data i_1 to the pixel data i_14 (symbol "i" indicates integer value of 0 to W−2), the control block is so arranged that the level of the data xSTRBO is set to "0" also in the time period during which the pixel data i_0 and the pixel data i_15 are output. This is because the image processing module 40b may use the circuits substantially identical to those of the image processing module 40a.

Both the pixel data RGBO and the strobe data xSTRBO corresponding to the outputs of the image processing module 40b are entered into the printer I/F circuit 41 (see FIG. 5) in combination with the clock signal CLK. The printer I/F circuit 41 fetches the data RGBO in the respective time periods during which the data xSTRBO becomes "0" in synchronism with the clock signal CLK, and then stores the fetched pixel data into such a storage area of the buffer memory 42. This storage area of the buffer memory 42 corresponds to both a column position and a line position of a pixel which is indicated by this fetched pixel data. Then, every time (n−d)×(W−d) pieces of pixel data have been stored into the buffer memory 42, this printer I/F circuit 41 supplies these stored pixel data to the printer 14 in both the line positional order and the column positional order, while the line positions of pixels indicated by the respective pixel data are used with a top priority. In this embodiment mode, 12×(W−4) pieces of pixel data are stored in the buffer memory 42 every time.

Figure 11A:
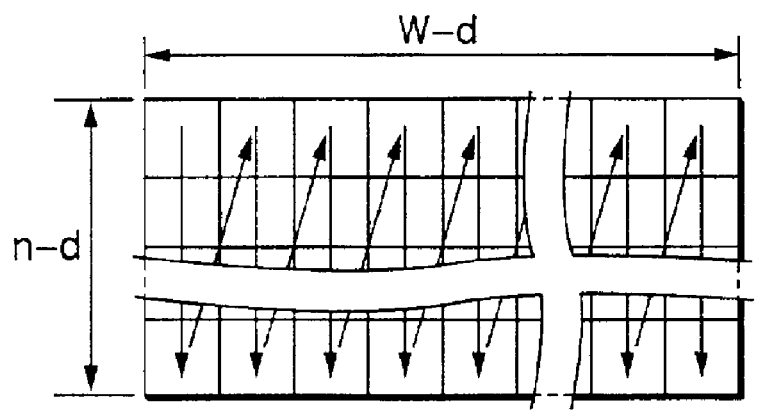
FIGS. 11(A) and 11(B) show an explanatory diagram for explaining operation of a printer I/F circuit provided in the printer I/F board.
Figure 11B:
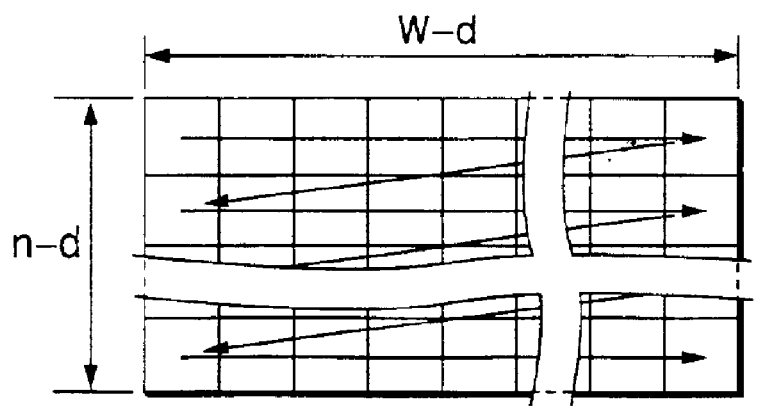
Figure 12:
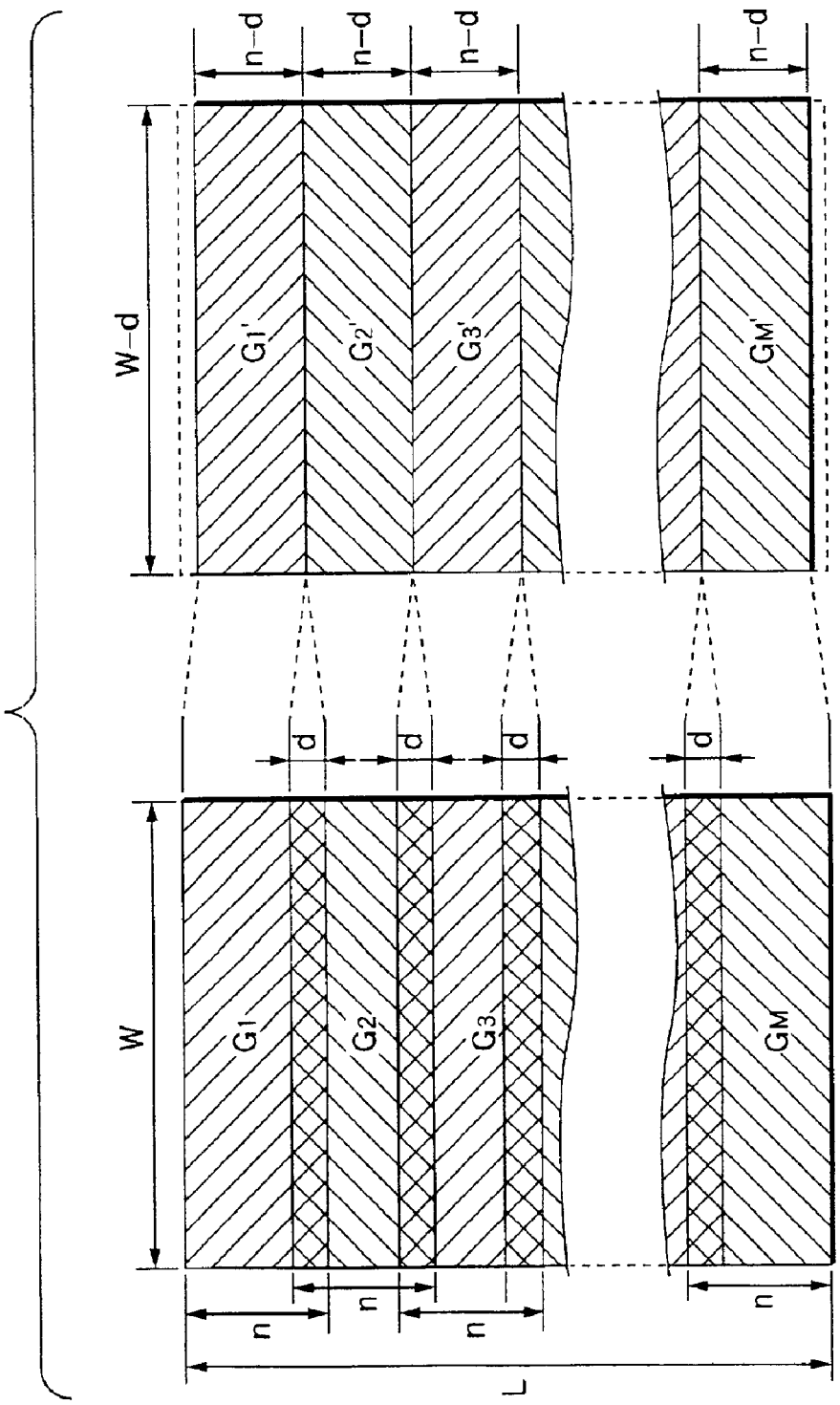
FIG. 12 is an explanatory diagram for explaining operations of the image processing apparatus according to the embodiment mode.

In other words, while the printer I/F circuit 41 repeatedly performs such a process operation "M" times that (n−d)×(W−d) pieces of pixel data which are supplied from the image processing circuit 40 in such a data supply sequence as illustratively shown in FIG. 11(A) are supplied in a sequence as represented in FIG. 11(B), this printer I/F circuit 41 outputs to the printer 14, such paper on which block images $G_1'$ to $G_M'$ are printed out, as illustratively indicated in FIG. 12. These block images $G_1'$ to $G_M'$ correspond to the above-explained block images $G_1$ to $G_M$, and have been image-processed.

The image constructed of these block images $G_1'$ to $G_M'$ is equal to such an image produced by executing a desirable image processing operation to the original image.

This reason is given as follows: While the image processing circuit 40 requires such pixel data related to "q×q" pieces (namely, 5 in this embodiment mode) of pixels so as to calculate one piece of pixel data, it is now assumed that a last line of such a block image $G_K'$ (symbol "K" shows integer value of 1 to M−1) is equal to an x-th line, this image processing circuit 40 requires such pixel data related to a (x−(g−1)/2)-th line through a (x+g)-th line of the original image so as to acquire pixel data related to the x-th line. Also, in order to acquire such pixel data related to a top line ((x+1)-th line) of another block image $G_{K+1}'$, the image processing circuit 40 requires such pixel data related to a (x+1−(g−1)/2)-th line through a (x+1+(g−1)/2)-th line of the original image.

In other words, the block image "$G_K$" may be made of such an image comprised of the continuous "n" lines of pixels of the original image, which are defined up to the (x+(g−1)/2)-th line, whereas the block image "$G_{K+1}$" may be made of such an image comprised of the continuous lines of pixels of the original image, which are defined up to the (x+1−(g−1)/2)-th line. Further, that is to say, "(x+(g−1)/2)−(x+1−(g−1)/2)+1" lines (=g−1=d) which are present at the final position of the block image $G_K$ may be contained in the block image $G_{K+1}$.

Then, as previously explained with reference to FIGS. 4(A) and 4(B), when the image data supplying process operation is carried out, one page of the original image data may be handled as such data indicative of the block images $G_1$ to $G_M$, which are comprised of the continuous "n" lines, respectively, and in which the overlapped portion made of the "d" lines is located between the own block image and another block image preceding to the own block image. As a result, the image comprised of the block images $G_1'$ to $G_M'$ can serve as an image in which the original image has been image-processed by the desirable image processing manner.

As previously described in detail, in the image processing apparatus 11 according to this embodiment mode, since the image processing circuit 40 is used plural times so as to image-process the image data, the image processing operation can be applied to such image data indicative of various images having any image sizes. Also, every time one block image of the image data is obtained from the scanner 13, since one-block-image print data is supplied to the printer 14, there is no such a problem that lengthy time is required so as to execute the copying operation.

MODIFIED EXAMPLE

The image processing apparatus 11 according to the above-explained embodiment mode corresponds to such an image processing apparatus operable in such a manner that the image processing operation such as the moire-pattern removing operation is carried out by utilizing the image processing circuit 40 with respect to the image data entered from the scanner 13, and then, the image-processed image data is output to the printer 14. Alternatively, the contents of the image processing operations executed in the image processing circuit 40, the input source of the image data which is image-processed, and the output destination of the image data which has been image-processed may be different from those of the above-described embodiment mode.

For example, as the image processing circuit 40, such a circuit may be employed, which may cause any one of the image processing module 40*a* and the image processing module 40*b* to function. In this alternative case, the image processing apparatus 11 may be arranged in such a manner that the image data supplying process operation is carried out, while such a value determined in accordance with a total number of the image processing modules 40*x* which are caused to function may be employed as the "d" value (namely, such a specific computer program may be formed). That is, to say the image processing apparatus 11 may be arranged, or a specific computer program may be formed in the case that both the image processing module 40*a* and the image processing module 40*b* are caused to function, the image data supplying process operation may be carried out, while 2×(m−1) is used as the "d" value (2m−1 is used as "q" value); whereas in the case that any one of these image processing modules 40*a* and 40*b* may be caused to function, the image data supplying process operation may be carried out, while (m−1) is used as the "d" value (namely, m is used as "q" value).

As previously explained, the image processing circuit 40 may be apparently made of such a circuit arranged by coupling the first image processing module to the P-th image processing module to each other, while an $h_i \times g_i$ filter (pixel data number along line direction is equal to $h_i$; $h_i \geq 3$) is mounted on the i-th (i=1 to P) image processing module.

In other words, the technical idea used in the image processing apparatus 11 according to this embodiment mode may be similarly applied to any types of apparatuses if these apparatus may perform certain image processing operation. For example, while this technical idea of the present invention is employed, an image processing apparatus may be manufactured in such a manner that while a preselected image processing operation is carried out with respect to image data which has been formed as a data file and has been stored into an auxiliary storage apparatus, the image-processed image data is formed as an image data file, and then, this image data file is stored. Alternatively, such an image processing apparatus that image-processed image data is displayed on a display unit may be manufactured.

In accordance with the image processing apparatus of the present invention, the image processing operation can be performed with respect to the image data indicative of the image having the arbitrary image size. Also, since the image processing circuit required in the image processing apparatus of the present invention can be manufactured by merely containing the buffer memory having the small capacity, the image processing apparatus according to the present invention can be realized by mounting a small number of image processing circuits.

What is claimed is:

1. An image processing apparatus for entering thereinto image data comprised of a plurality of pixel data and for image-processing the respective pixel data to output the image-processed pixel data, the apparatus comprising:
   an image data storage unit configured to store "n" pieces of lines, each of which has "W" pieces of pixel data, and configured to store thereinto an input image data in order of the lines, where the "n" is predetermined value, and the "W" is predetermined value;
   an image processing circuit, which has a pixel data holding unit including "X" pieces of pixel data column holding units configured to hold the "n" pieces of the pixel data, where the "X" is a predetermined value smaller than the predetermined value "W", and which executes an image processing operation by using a filter which has an "h" and a "g", where the "h" is a predetermined value smaller than, or equal to the predetermined value "X", and the "g" is a predetermined value smaller than, or equal to the predetermined value "n"; and
   an image data supplying unit which reads out the pixel data stored in the image data storage unit along a column direction, and supplies the read pixel data to the image processing circuit, the image data supplying unit configured to subdivide the image data into a plurality of image data blocks to supply the plural image data blocks to the image processing circuit when a total line number of image data to be image-processed is larger than the predetermined value "n," and, the image data supplying unit configured to overlap one image data block preceding to a relevant image data block with a (g−1) line when the image data blocks are supplied to the image processing circuit after a second data block supplying operation.

2. An image processing apparatus for entering thereinto image data comprised of a plurality of pixel data and for image-processing the respective pixel data to output the image-processed pixel data, the apparatus comprising:
   an image processing circuit which receives the image data, in which a total number of pixels along a line direction is made coincident with a predetermined value "n", and outputs image data obtained by image-processing the received image data, and one set or more sets of pixel data in which "q" pieces of pixels are arranged along the line direction of the image to be processed are required for a calculation of one piece of pixel data; and
   an original image data supplying unit which produces block image data based upon both original image data to be image-processed and an integer value "d" obtained by subtracting "1" from the predetermined value "q" and the "n" value with respect to a block image comprised of continuous "n" lines of pixels on an original image indicated by the original image data, a column direction of the original image being regarded as the line direction in the block image data, the original image data supplying unit configured to execute a supply processing operation a plurality of times, by which the block image data is supplied to the image processing circuit, and produce such block image data related to a block image which is comprised of continuous "n" lines of pixels containing a lower-ended "d" line of pixels within a block image directed to a preceding supply process operation for each of the supply processing operations subsequent to the execution of a second supply processing operation.

3. An image processing apparatus for entering thereinto image data comprised of a plurality of pixel data and for image-processing the respective pixel data to output the image-processed pixel data, the apparatus comprising:
   an image data storage unit configured to store "n" pieces of lines, each of which has "W" pieces of pixel data, and configured to store thereinto the input image data in order of the lines, where the "n" is predetermined value, and the "W" is predetermined value;
   an image processing circuit, which has a pixel data holding unit including "X" pieces of pixel data column holding units configured to hold the "n" pieces of the pixel data, where the "X" is a predetermined value smaller than the predetermined value "W", and which includes a first image processing module which employs an (m×m) filter and a second image processing module which employs a (q−m+1×q−m+1) filter, where q is a number of pixels arranged along the line direction of the image to be processed and required for a calculation of one piece of pixel data; and an image data supplying unit which reads out the pixel data stored in the image data storage unit along a column direction, and supplies the read pixel data to the first image processing circuit.

4. An image processing apparatus for entering thereinto image data comprised of a plurality of pixel data and for image-processing the respective pixel data to output the image-processed pixel data, the apparatus comprising:

an image data storage unit configured to store "n" pieces of lines, each of which has "W" pieces of pixel data, and configured to store thereinto an input image data in order of the lines, where "n" is predetermined value, and the "W" is predetermined value;

an image processing circuit containing a first image processing module equipped with an $(m_1 \times m_1)$ filter and a second image processing module equipped with an $(m_2 \times m_2)$ filter, the image processing circuit configured to cause both the first and second image processing modules to function, or cause any one of these first and second image processing modules to function; and an image data supplying unit which reads out the pixel data stored in the image data storage unit along a column direction, and supplies the read pixel data to the image processing circuit, the image data supplying unit configured to set a "q" value to $q=m_1+m_2-1$ when the image processing circuit causes both the first and second image processing modules to function, the image data supplying unit configured to set the "q" value to $q=m_1-1$ when the image processing circuit causes only the first image processing module to function, and the image data supplying unit configured to set the "q" value to $q=m_2-1$ when the image processing circuit causes only the second image processing module to function, where q is a number of pixels arranged along the line direction of the image to be processed and required for a calculation of one piece of pixel data.

5. An image processing apparatus for entering thereinto image data comprised of a plurality of pixel data and for image-processing the respective pixel data to output the image-processed pixel data, the apparatus comprising:

an image data receiving unit configured to receive image data from a scanner, the image data comprising "n" pieces of lines, each of which has "W" pieces of pixel data, and configured to store thereinto an input image data in order of the lines, where the "n" is predetermined value, and the "W" is predetermined value;

an image processing circuit, which has a pixel data holding unit including "X" pieces of pixel data column holding units configured to hold the "n" pieces of the pixel data, where the "X" is a predetermined value smaller than the predetermined value "W", and which executes an image processing operation by using a filter which has an "h" and a "g", where the "h" is a predetermined value smaller than, or equal to the predetermined value "X", and the "g" is a predetermined value smaller than, or equal to the predetermined value "n"; and an image data supplying unit which supplies the pixel data received by the image data receiving unit to the image processing circuit, the image data supplying unit configured to subdivide the image data into a plurality of image data blocks to supply the plural image data blocks to the image processing circuit when a total line number of image data to be image-processed is larger than the predetermined value "n," and the image data supplying unit configured to overlap one image data block preceding to a relevant image data block with a (g−1) line when the image data blocks are supplied to the image processing circuit after a second data block supplying operation.

6. The image processing apparatus claimed in claim 5 further comprising:

a buffer memory configured to temporarily store therein the image data output by the image processing circuit.

7. The image processing apparatus claimed in claim 5 further comprising:

a printer interface unit and a printer, the printer interface unit configured to supply the image data stored in the buffer memory to the printer, the image data supplied to the printer in a preselected sequence different from a sequence output from the image processing circuit.

* * * * *